March 3, 1936. E. D. TILLYER ET AL 2,033,101
OPHTHALMIC LENS
Filed Oct. 13, 1933  2 Sheets-Sheet 1
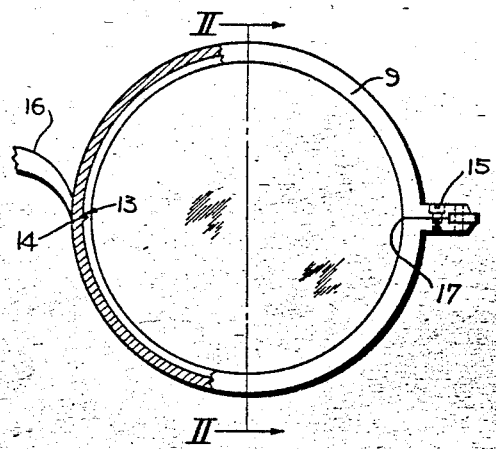
FIG. I.
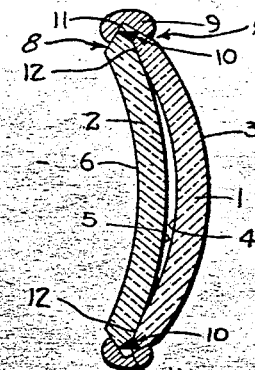
FIG. II.
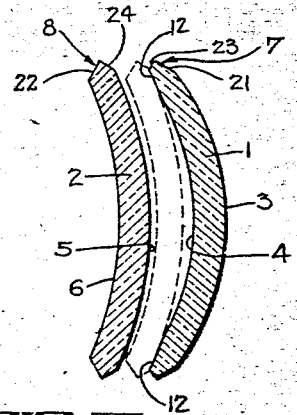
FIG. III.
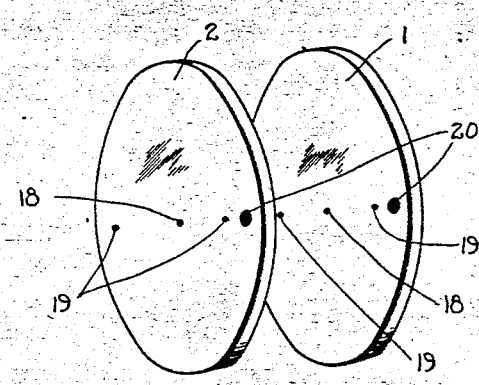
FIG. IV.
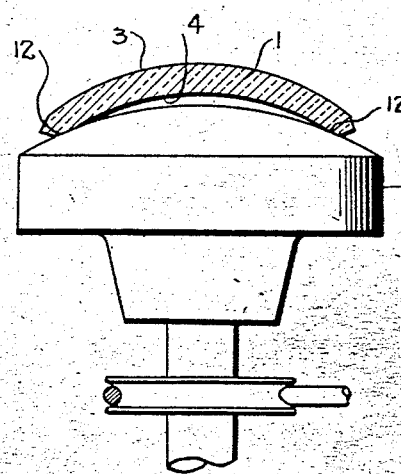
FIG. VI.
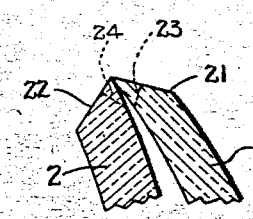
FIG. V.
INVENTORS
EDGAR D. TILLYER
HAROLD R. MOULTON.
BY
Harry H. Styll
ATTORNEY

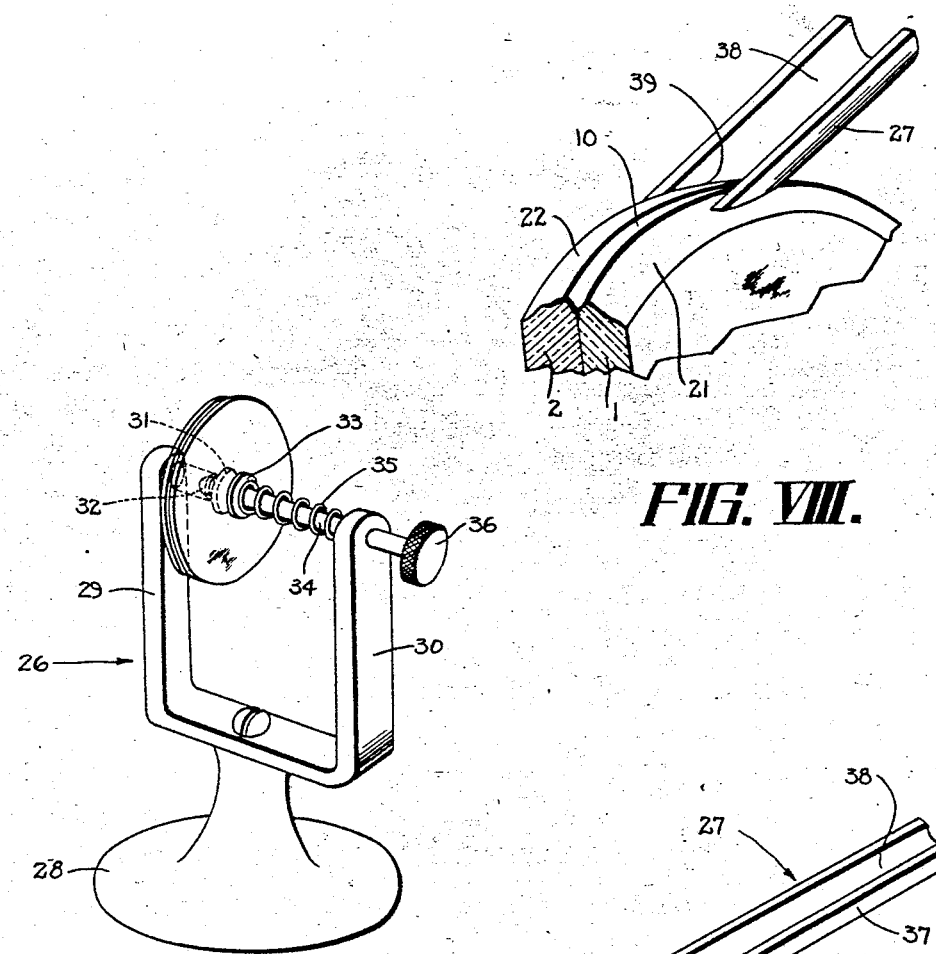

Patented Mar. 3, 1936

2,033,101

UNITED STATES PATENT OFFICE 2,033,101

OPHTHALMIC LENS

Edgar D. Tillyer, Southbridge, and Harold R. Moulton, Sturbridge, Mass., assignors to American Optical Company, Southbridge, Mass., a voluntary association of Massachusetts Application October 13, 1933, Serial No. 693,444

10 Claims. (Cl. 88—54)

This invention relates to improvements in lenses and to an improved process of making the same.

One of the principal objects of the invention is to provide improved means and process of making and mounting lenses having more than two refractive lens elements wherein the parts of said lenses may be fitted and secured together at their peripheral edges to prevent the entrance of dirt, dust, moisture, etc., and to hold the lens elements in proper relation with each other.

Another object of the invention is to provide a lens of the above character and process of making the same wherein the two lens elements are so constructed as to have the appearance of a single lens and so that the lens elements may be mounted as though they were a single lens.

Another object is to provide improved means for supporting a pair of lens elements of different shapes in superimposed relation with each other whereby shocks and strains on said elements will be absorbed and distributed substantially equally throughout their peripheral areas.

Another object is to provide an improved process of making a lens having more than one lens element wherein one of the lens elements is provided with a peripheral seat to fit a surface of the other lens element so that the said lens elements may be fitted and united together to form a unitary lens structure.

Another object is to provide improved means in a lens of this character for confining the flow of the securing or sealing means to the peripheral edges thereof.

Another object is to provide an improved compound lens of this character and process of making the same wherein the lens elements may be placed in desired separated relation with each other and with their axes accurately matched one with the other and be united into a unitary structure to hold this relation.

Another object is to provide improved means and process of uniting or sealing the entire peripheral edges of the lens elements of a compound lens of this character.

Another object is to provide improved means and process of supporting the lens elements in desired relation with each other and of applying the securing or edge sealing means to the peripheral edges of said lens elements to hold them in this relation.

Another object is to provide simple, and efficient means of mounting the lenses in their lens holding means.

Another object is to provide improved simple efficient and economical means for carrying out all of the steps of the process of making lenses of the above character.

Other objects and advantages of the invention will become apparent from the following description taken in connection with the accompanying drawings, and it will be apparent that many changes may be made in the arrangement of parts, details of construction and steps of the process without departing from the spirit of the invention as expressed in the accompanying claims. We, therefore, do not wish to be limited to the exact arrangement of parts, details of construction and steps of the process shown and described as the preferred forms only have been shown by way of illustration.

Referring to the drawings:

Fig. I is a fragmentary front elevation of an ophthalmic lens embodying the invention showing a portion of its mounting in cross section;

Fig. II is a sectional view taken on line II—II of Fig. I;

Fig. III is a sectional view of the lens elements showing them separated;

Fig. IV is a diagrammatic perspective view showing the lens elements separated and illustrating a step in the process of manufacture;

Fig. V is a fragmentary sectional view of the lens elements illustrating another step in the process of manufacture;

Fig. VI is a side elevation of the means for forming the seat on one of the lens elements;

Fig. VII is a perspective view of the means for holding the lens elements in aligned relation with each other so that the edges thereof may be sealed;

Fig. VIII is a fragmentary perspective view illustrating the sealing operation; and Fig. IX is a fragmentary perspective view of the sealing tool.

In the past, due to the nature of the contacting surfaces of compound lenses which in most instances are of different curvatures having only a line contact with each other, much difficulty has been encountered in having dirt, dust, moisture, etc., work in between the lenses causing the lenses to become fogged and dirty and sometimes a hindrance to vision rather than an aid. Another great difficulty encountered in lenses of this character, also due to the collection of dirt, dust, moisture, etc. between the lens elements, has been the necessity of having to separate the said elements for the purpose of cleaning and with a danger of moving the said elements from their prescriptive relation with each other. This defect is very serious as a slight alteration of the prescriptive alignment of the lens elements changes the corrective properties of the lens, causing much discomfort and serious reaction on the part of the patient.

Some attempts have been made, in the past, to seal the peripheral edges against the entrance of dirt, moisture, etc. but in instances wherein the matched surfaces were of different curvatures the said surfaces, at different points along the peripheral edges thereof, were such that the flow of the securing or sealing liquid could not be controlled and the said liquid would flow between the lens elements, making it necessary to separate the said elements, clean the surfaces thereof, realign their centers and/or axes and again attempt to secure or seal the edges without allowing the sealing liquid to flow between the said elements. This procedure in many instances had to be repeated several times before the sealing could be successfully completed.

It, therefore, is one of the primary objects of this invention to overcome the above difficulties by providing improved means and process of uniting the lens elements to produce a unitary structure whereby the peripheral edges of said elements may be neatly, quickly and positively sealed against the entrance of dirt, dust, moisture, etc., and so that the said elements will be held in accurate aligned and spaced relation with each other during use.

Referring more particularly to the drawings wherein like characters of reference designate like parts throughout the several views, the lens embodying the invention, as shown in finished form in Figures I and II, comprises two lens elements 1 and 2, each having finished optical surfaces 3, 4, 5, and 6 thereon of the required curvatures to produce the prescriptive requirements of the lens. In use the lens elements 1 and 2 are placed in superimposed relation with each other and their optical surfaces 3, 4, 5, and 6, thickness, and the separation thereof provide the required power and correction for cylinder, sphere, prism, and image size and/or shape equalization, etc. These surfaces 3, 4, 5 and 6 may be spherical, cylindrical, toric, bitoric, aspheric, plano or of any required shapes or curvatures to produce the desired results. The present invention does not deal primarily with the forming and finishing of the surface curvatures but relates more particularly to improved means and process of mounting the lens elements in proper relation with each other after the required surfaces 3, 4, 5, and 6 have been formed thereon.

The peripheral edges of the lens elements 1 and 2 are provided with V shaped bevels 7 and 8, as shown in Fig. II, to fit the V groove of the lens holding means 9 and, when the parts are fitted together, to provide a peripheral groove 10 for the securing or sealing means 11.

In most instances the contiguous faces 4 and 5 of the lens elements 1 and 2 are of different curvatures, as for example, the surface 5 may be spherical with a long radius and the surface 4 spherical with a short radius, toric or cylindrical, having only a line contact with said surface 5. For this reason a seat 12 having a spherical or other surface of the required radius to produce a surface contact with the surface 5 is formed adjacent the peripheral edge of the surface 4. This seat 12 is formed to such a depth as to place the elements 1 and 2 in proper spaced relation with each other and so that said seat will have a surface contact with the surface 5 around the entire edge of the lens. This permits the lens elements to be computed to fit in close relation with each other and permits the forming of a more compact and practical lens.

This peripheral seat 12, due to the fact that it is in surface contact with the surface 5, confines the securing or sealing liquid within the groove 10 and prevents its flowing between the lens elements as has been usual in the past. The seat 12 which engages the surface 5 throughout the entire peripheral edge of the lens provides means for distributing shocks and strains on said elements throughout their entire peripheral edges instead of only at a two point contact as would for example be the case if the surface 5 were spherical and the surface 4 were cylindrical and no seat were provided.

The lens elements 1 and 2 when in secured relation with each other are provided with a notch or similar means 13 (Fig. I) which is adapted to engage a projection 14 internally of the groove in the lens holding means. This provides means for holding the lens against turning and moving off axis in its holding means during use.

The lens holding means 9 is of the usual prior art type having a split temple connection 15 and bridge member 16. The holding means is split at 17 in the usual prior art manner to permit the insertion or removal of lenses.

The process of making and mounting the lens elements 1 and 2 is as follows:

The lens elements 1 and 2 are ground and polished in the usual prior art manner to form the required optical surfaces 3, 4, 5 and 6.

The said elements, as shown in Fig. IV, are then placed in a device for locating and marking the center and/or axis of each element as indicated by the markings 18 and 19.

The lens elements are then cut to the required shape in the usual prior art manner and are provided, either before or after they are cut, with any suitable indication marks 20 so that the said lens elements may be maintained in proper relation with each other throughout the various steps of the operation. To more clearly point out the function of the indication marks 20, let us assume for example that the centers and/or axes of the elements have been located and that the said elements when cut and edged are slightly off axis relative to said centers so that the distance from said centers to the right edges of the elements is 1 millimeter greater than the distance from said centers to the left edges of said elements, an error which is very common and practically unavoidable in practice. It is apparent that although the centers will be aligned when the elements are in proper edged relation with each other that if reversed during their process of assembling and uniting, that is so that the left edge of one element is matched with the right edge of the other, the centers of said elements will not be aligned but will be separated about 2 millimeters. It is also apparent that this error could be introduced without changing the meridional positions of the axes other than to move the said axes out of aligned relation with each other. The function, therefore, of the indication marks 20 is to provide means for indicating the accurate relation in which the lens elements should be united.

After the lens elements have been cut as above described they are placed in accurate aligned relation with each other on a suitable aligning device and are temporarily secured together in this relation by any suitable means such as pitch, cement or a mechanical arrangement.

The lens elements are then simultaneously edged, as shown in Fig. V, to form the outer beveled faces 21 and 22 and are then separated and the inner grove forming beveled faces 23 and 24 are formed. It is to be understood that the angles of these various beveled faces are such as to provide a snug fit with the groove of the lens holding means and to provide a suitable peripheral groove 10 to receive the sealing means 11 when the lens elements are fitted together.

After the said elements have been properly edged the surface 4 of the element 1 which is to be fitted to the surface 5 is formed with the peripheral seat 12. This seat 12 is formed normal to the axis of the element 1 as shown in Fig. VI, by surfacing the said edge on a surfacing tool 25 having the same or substantially the same curvature as the curve of the surface 5. It is apparent that the surface of the seat 12 will fit snugly with the surface 5 and prevent the liquid sealer from flowing between the lens elements. The seat 12 is formed to such a depth as to position the elements 1 and 2 in proper spaced relation with each other when the lens is finished and provides means whereby the diameter of the lens may be increased without increasing the space between said lens elements. This space is controlled by the depth to which the seat is formed.

After the lens elements have been properly edged and seated the positions of said elements with respect to each other are carefully noted and the surfaces thereof are cleaned for the final assembling.

The elements are then fitted together and the centers and/or axes thereof are carefully aligned with each other on suitable aligning means such as a commonly known Axometer or device of a similar nature. Attention is directed to the fact that care is taken not to reverse the positions of the elements during these cleaning and aligning operations. After the lens elements have been carefully aligned they are clamped and transferred to a device 26 such as shown in Fig. VII, wherein the said elements are supported in aligned relation with each other so that they may be rotated to simplify the operation of sealing the edges.

The edges are then sealed by the use of a tool 27 such as shown in Figures VIII and IX which carries the sealing liquid in a manner similar to a pen and allows the said liquid to flow in the groove 10 as the lens elements are rotated. After the said elements have been sealed or cemented together the notch 13 which engages the projection 14 in the holding means is formed in the edge thereof by a file or other suitable means.

Attention is directed to the fact that the notch 13 is formed at such a position as to position the axis of the lens in proper relation with its holding means and so that the said lens will be supported and held in said position. The lenses are finally carefully checked and are then mounted in their lens holding means ready for use.

It is apparent that if desired to the lens elements 1 and 2 may be edged separately instead of simultaneously to form the bevel edges 21 and 22, the only difference in the operation being to edge the said elements to the required finished size and shape by a so-called rimless edging process which forms a flat edge on the periphery of the elements and to thereafter form the bevels on said edges.

It is also apparent that although applicants describe the forming of the notch 13 only after the elements have been sealed together the said notch may be formed at any suitable time previous to the sealing if desired, the only important factor being that the said elements are in proper relation with each other when the notch is being formed.

The device 26 for supporting the lens elements during the sealing operation, as shown in Fig. VII, comprises a base 28 having spaced uprights 29 and 30. The upright 29 has a bearing pad 31 pivotally attached thereto by a ball and socket or other suitable connection 32 and the upright 30 has a bearing pad 33 mounted on the end of a rod 34 which is rotatably and slidably mounted in said upright. The pad 33 is constantly urged toward the pad 31 by a spring member 35. The rod 34 is provided with a fingerpiece 36 by which it may be rotated.

The lens elements 1 and 2 are adapted to be clamped between the pad members 31 and 33 and are adapted to rotate when the fingerpiece 36 is rotated. The pads are provided with cushion means which frictionally engage the surfaces of the lenses and are such that they will not injure said surfaces. As the lens members 1 and 2 are rotated the tool 27, which, as shown in Fig. VIII, comprises a rod like member 27 having a longitudinal groove 38 therein forming a member having a U shaped cross section and having an angled end portion 39, is constantly held in engagement with the bevelled edges 21 and 22 and in alignment with the groove 10 in said elements.

The tool 27 is provided internally of its groove 38 with the liquid cement or sealer which flows into the groove 10 as the lens elements are rotated. The cement or sealer is of any suitable quick drying nature which is adapted to seal and secure the edges together in a minimum amount of time.

If desired, instead of using the cement or sealer described above, which hardens and adheres to the elements, a suitable flux may be placed in the groove 10 by which the lens elements may be subjected to heat and be permanently fused together. It is to be understood that the flux in this instance is of such a nature that fusion will take place without injuring the finished optical surfaces on said elements.

If desired the surface of the seat 12 may be coated with rubber cement, compounded rubber latex, vinyl compounds, or other known plastics or cements and some of these cements or plastics may be vulcanized in place between the seat 12 and the adjacent surface of the other element of the lens to provide means between said elements for absorbing shocks and strains during use. It is to be understood that such cements or plastics may also be used as a sealer in the groove 10 if desired, the main factor being to mount the lens elements in proper relation with each other and to seal the edges of said elements to prevent the entrance of dirt, dust, moisture, etc. and if desired to provide means for absorbing shocks and strains on said lens elements.

From the foregoing description it will be seen that we have provided simple, efficient and economical means and process of accomplishing all of the objects and advantages of the invention, particularly that of securing a plurality of lens elements together to form a unitary lens structure wherein dirt, dust, moisture etc. cannot work in between said elements during use.

Having described our invention we claim:

1. A lens comprising a plurality of aligned lens elements having contiguous faces of varying curvatures and having angled edges fitted together to form a peripheral groove, one of said faces having a seat thereon shaped to fit the engaging face of the other element with substantially surface contact adjacent the base of the groove and means in the groove for sealing the edges of said elements together, the said substantially surface contacting seat and engaging face at the base of the groove forming means for confining and preventing the sealing means flowing between and over the contiguous faces.

2. The process of fitting and sealing the edges of separate lens elements having contiguous faces of different curvatures thereon, comprising shaping the edges of the contiguous faces so that when the said faces are in superimposed relation with each other the said edges will form a peripheral groove, providing one of said elements with a seat adjacent its edge having a surface of substantially the same shape as the engaging surface of the other element and fitting said surface with substantially a surface contact at the base of the groove, placing the said elements in superimposed and aligned relation with each other, and placing a sealing compound in the peripheral groove to seal the peripheral edges of said elements together, the said substantially surface contacting seat and engaging surface at the base of the groove forming means for confining and preventing the sealing means flowing between and over the contiguous faces.

3. The process of fitting and sealing the edges of separate lens elements having contiguous faces of different curvatures thereon, comprising shaping the edges of the contiguous faces so that when the said faces are in superimposed relation with each other the said edges will form a peripheral groove, providing one of said elements with a seat adjacent the groove having a surface of substantially the same shape as the engaging surface of the other element and fitting said surface with substantially a surface contact at the base of the groove, placing the said elements in superimposed and aligned relation with each other, placing a flux in the groove and subjecting the parts to heat to integrally melt the flux and then allowing the flux to cool and secure the peripheral edges together, the said contacting surfaces at the base of the groove forming means for confining and preventing the flux flowing between and over the contiguous faces during the securing operation.

4. The process of forming a lens of separate elements having contiguous faces of different curvatures on one side and having finished optical surfaces on the opposite faces thereof, comprising locating and marking the centers and/or axes on said elements, cutting the said elements approximately to required shape and in predetermined relation with their centers and/or axes, edging the said elements to their finished shapes and to form edges on the contiguous faces thereof so that when the said elements are in superimposed relation with each other the said edges will form a peripheral groove, forming a seat adjacent the edge of one of the contiguous faces with a surface shaped to fit the engaging surface of the other face with substantially a surface contact at the base of the groove, placing the said elements in superimposed and aligned relation with each other and placing a sealing compound in the groove to seal the said elements together, the said surface substantially in surface contact with the engaging surface at the base of the groove forming means for confining and preventing the sealing compound flowing between and over the contiguous faces.

5. The process of forming a lens of separate lens elements having contiguous optical faces of different curvatures on one side and having finished optical surfaces on the opposite faces thereof, comprising cutting the said elements to approximately the required shape, temporarily securing the said elements together in aligned relation with each other, forming beveled edges on the outer surfaces thereof when in temporary secured relation with each other, separating the said elements and forming beveled edges on the contiguous faces thereof, which when the said faces are in superimposed and aligned relation with each other form a peripheral groove, forming a seat on one of said contiguous faces adjacent the beveled edge thereof having a surface of substantially the same shape and fitting in substantially surface contact with the engaging surface of the other element, placing the two elements in superimposed and aligned relation with each other to form the continuous peripheral groove and placing a sealing compound in the groove to seal the said peripheral edges together.

6. The process of forming a lens of separate lens elements having contiguous faces of different curvatures comprising shaping the edges of the contiguous faces so that when the said faces are in superimposed relation with each other the said edges will form a peripheral groove, providing one of said elements with a seat having a surface of substantially the same shape as the engaging surface of the other element and in substantially surface contact therewith, placing said elements in superimposed and aligned relation with each other in a holder, rotating said elements as a unit while held in said holder and feeding a sealing compound in the groove during the rotation of said elements to seal said groove.

7. A lens comprising a plurality of lens elements mounted in superimposed relation with each other, one of said elements having desired lens surfaces on the opposite sides thereof, and the other element having desired lens surfaces on its respective sides, the adjacent surfaces of said elements being noncomplementary and each of said elements being of substantially the same size and shape and having beveled peripheral edges which when the elements are in superimposed relation with each other form a peripheral groove and one of said elements having a complementary surface adjacent its beveled edge engaging the inner surface of the other element adjacent its beveled edge and forming substantially contacting surfaces at the base of the peripheral groove and means in the groove for sealing the lens elements together, said substantially contacting surfaces forming means for confining the flow of the sealing means to prevent its flowing between and over the inner noncomplementary surfaces during the sealing operation.

8. A lens comprising a plurality of lens elements mounted in superimposed relation with each other, one of said elements having desired lens surfaces on the opposite sides thereof and the other element having desired lens surfaces on its respective sides, the inner surfaces of said elements being noncomplementary and each of said elements being of substantially the same size and shape and having oppositely beveled peripheral edges, the outer bevels of which are adapted to fit the groove of a lens retaining rim, and the inner bevels being adapted to form a peripheral groove, one of said elements having a complementary surface adjacent its beveled edge engaging the inner surface of the other element adjacent its beveled edge and forming substantially contacting surfaces at the base of the peripheral groove, and means in the groove for sealing the lens elements together, said substantially contacting surfaces forming means for confining the flow of the sealing means to prevent its flowing between and over the inner noncomplementary surfaces during the sealing operation.

9. The process of forming a compound lens comprising forming desired lens surfaces on the opposite sides of a lens element, forming desired lens surfaces on the respective sides of another lens element, the inner surfaces of which are noncomplementary, edging the contour of the lens elements to form beveled peripheral edges which when the elements are fitted together are adapted to form a peripheral groove, forming a complementary surface adjacent the beveled edge of one of said lens elements to fit the inner surface of the other lens element adjacent the base of the groove and with substantially a surface contact, and placing a sealing compound in the peripheral groove to seal the edges of the lens elements together, the said complementary surface forming means during the sealing operation for confining the flow of the sealing compound to prevent its flowing between and over the inner noncomplementary surfaces during the sealing operation.

10. The process of forming a compound lens comprising forming desired lens surfaces on the opposite sides of a lens element, forming desired lens surfaces on the respective sides of another lens element, the inner surfaces of which are noncomplementary, edging the contour of the lens element to substantially the same size and shape and to form oppositely beveled peripheral edges, the outer bevels of which are adapted to fit the groove of a lens supporting rim and the inner bevels being adapted to form a peripheral groove when the lens elements are fitted together, forming a complementary surface adjacent the beveled edge of one of said lens elements to fit the inner surface of the other lens element adjacent the base of the groove and with a substantially surface contact and placing a sealing compound in the peripheral groove to seal the edges of the lens elements together, the said complementary surface forming means during the sealing operation for confining the flow of the sealing compound to prevent its flowing between and over the inner noncomplementary surfaces during the sealing operation.

EDGAR D. TILLYER.
HAROLD R. MOULTON.